United States Patent
Lundbladh (10) Patent No.: US 8,485,783 B2
(45) Date of Patent: Jul. 16, 2013

(54) GAS TURBINE ENGINE

(75) Inventor: Anders Erik Lundbladh, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 490 days.

(21) Appl. No.: 12/809,606

(22) PCT Filed: Dec. 20, 2007

(86) PCT No.: PCT/SE2007/001151
§ 371 (c)(1),
(2), (4) Date: Jul. 31, 2010

(87) PCT Pub. No.: WO2009/082281
PCT Pub. Date: Jul. 2, 2009

(65) Prior Publication Data
US 2010/0301617 A1  Dec. 2, 2010

(51) Int. Cl.
*F01D 13/00* (2006.01)

(52) U.S. Cl.
USPC ............. 416/128; 415/67; 415/68; 416/198 A (58) Field of Classification Search
USPC ................... 415/60, 65, 66, 67, 68; 416/128, 416/120, 125, 15, 198 A; 60/805
See application file for complete search history.

(56) References Cited

U.S. PATENT DOCUMENTS

| | | | |
|---|---|---|---|
| 3,363,831 A | 1/1968 | Garjnier | |
| 3,385,509 A | 5/1968 | Garnier | |
| 3,524,318 A | 8/1970 | Bauger et al. | |
| 4,159,624 A | 7/1979 | Gruner | |
| 4,287,715 A | 9/1981 | Klees | |
| 4,463,553 A * | 8/1984 | Boudigues | 60/268 |
| 4,790,133 A | 12/1988 | Stuart | |
| 5,281,087 A | 1/1994 | Hines | |
| 5,806,303 A | 9/1998 | Johnson | |
| 5,911,679 A | 6/1999 | Farrell et al. | |
| 6,551,057 B1 | 4/2003 | Haaser et al. | |
| 6,931,856 B2 * | 8/2005 | Belokon et al. | 60/772 |

OTHER PUBLICATIONS

International Preliminary Report on Patentability for corresponding International Application PCT/SE2007/001151, Dec. 1, 2009.
International Search Report for corresponding International Application PCT/SE2007/001151, Nov. 18, 2008.

* cited by examiner

*Primary Examiner* — Nathaniel Wiehe
*Assistant Examiner* — Justin Seabe
(74) *Attorney, Agent, or Firm* — WRB-IP LLP (57) ABSTRACT

A gas turbine engine includes in serial flow relationship: a first compressor provided with at least one row of compressor blades distributed circumferentially around the first compressor; a combustion chamber; and a first turbine provided with at least one row of turbine blades distributed circumferentially around the first turbine, wherein the first compressor and the first turbine are rotationally rigidly connected by a first shaft. The first turbine is adapted to influence a gas flow rate through the gas turbine engine depending on a rotational speed of the first turbine, wherein the gas turbine engine further includes an arrangement for controlling the rotational speed of the first turbine. A method for controlling a gas flow rate in an axial flow gas turbine engine is also provided.

33 Claims, 6 Drawing Sheets

GAS TURBINE ENGINE

BACKGROUND AND SUMMARY

This invention relates to a gas turbine engine and a method for controlling a gas flow rate in an axial flow gas turbine engine. In particular, the invention relates to a gas turbine engine arranged for propulsion of an aircraft.

The fuel consumption of gas turbine engines is normally higher at part power than at full power due to the lower pressure and temperature ratios (between compressed air and inlet air) at part power operation. Considerable savings in fuel consumption (around 5% for a commercial turbofan aircraft engine) are potentially possible to achieve if the gas turbine engine can be operated with a higher pressure and temperature at part power. It is known that application of a variable cycle to an axial flow gas turbine engine, such as an aircraft turbo-jet engine, is useful for this purpose. In short, to apply a variable cycle to a gas turbine engine means that the air mass flow and the pressure ratio of a certain engine can be adapted to different operation modes. The effects of variable cycle gas turbine engines are, for instance, described in U.S. Pat. Nos. 4,287,715, 5,806,303 and Lundbladh, A. and Avellan, R., Potential of variable cycle engines for subsonic air transport, ISABE 2007-1156, 2007.

There are various ways of achieving a variable cycle turbofan engine. The two most common ways is to provide a variable fan flow or a variable core flow. Of these, the variable fan flow is primarily useful for a supersonic aircraft.

Most variable cycle gas turbine engines rely on variations in the low pressure part of the engine. One example is to use a variable low pressure turbine operated in a heat exchanged cycle. However, this requires bulky and heavy heat exchangers with potential durability/reliability drawbacks.

Another example is to use variable turbine cooling, where the turbine cooling and associated losses are reduced during the cruise phase where maximum efficiency is sought. However, this concept can not give the full energy saving potential as the primary inefficiency of part power operation from lowering the temperature and pressure are not addressed.

Although the theory behind variable core flow gas turbine engines is very promising, there are still problems in practical implementation of this concept.

To achieve a variable core flow, U.S. Pat. No. 5,806,303 proposes the use of variable turbine stator blades for varying the high-pressure turbine area. Variable blades arranged close downstream of the combustion area are, however, exposed to a rough environment with very high temperatures. A drawback of this solution is therefore a questionable durability/reliability of the components involved.

Thus, there is still a need for improvements in this field.

It is desirable to provide a gas turbine engine, in particular a gas turbine engine for propulsion of an aircraft, that has a lower fuel consumption compared to conventional gas turbine engines.

The invention concerns a gas turbine engine comprising in serial flow relationship: a first compressor provided with at least one row of compressor blades distributed circumferentially around the first compressor; a combustion chamber; and a first turbine provided with at least one row of turbine blades distributed circumferentially around the first turbine, wherein the first compressor and the first turbine are rotationally rigidly connected by a first shaft.

The inventive gas turbine engine is characterized in that the first turbine is adapted to influence a gas flow rate through the gas turbine engine depending on a rotational speed of the first turbine, wherein the gas turbine engine further comprises means for controlling the rotational speed of the first turbine.

Thus, the inventive gas turbine engine makes it possible to vary the gas flow rate through the engine by controlling the rotational speed of the first turbine. An effect of decreasing the flow rate through the gas turbine engine is that the overall pressure ratio, i.e. the ratio between the pressure in the combustion chamber and the pressure at the main air inlet of the gas turbine engine, will increase. The invention thus decouples the pressure ratio and the flow rate from each other so that the gas turbine engine can be used to make a variable cycle engine. The gas turbine engine, i.e. the engine core of e.g. a turbo-fan engine, can now be run e.g. at a high flow rate and medium-high pressure ratio, in order to provide maximum power, or at a low flow rate and high pressure ratio, in order to provide maximum efficiency (i.e. minimum fuel consumption) at part power.

In conventional gas turbine engines both the gas flow rate and the pressure ratio increase with increasing amounts of fuel supplied to the combustion chamber. In the inventive gas turbine engine, it is possible to reach a higher pressure also at a lower level of fuel supply, i.e. it is possible to let the compressor operate at a higher operating line at part power.

That "the first turbine is adapted to influence a gas flow rate through the gas turbine engine depending on a rotational speed of the first turbine" means in particular that there is no inlet stator associated with the first turbine.

Normally, such a stator is considered to form part of the turbine and is positioned upstream of the turbine rotor for swirling the gas flow into the turbine rotor so as to increase the power output of the turbine. Turbine inlet stators are commonly arranged so that the flow is choked over a large part of the engine operating range. This simplifies the flow design of engine components in the compressor and the combustor. The flow rate of a choked gas flow can not be influenced by downstream variations, such as a varying rotation speed of a downstream turbine rotor. In contrast, the turbine of the invention allows the gas to flow in a more or less axial direction into the turbine rotor. The flow rate of an axially directed gas flow can be influenced to a higher degree by the rotational speed of the turbine than a swirling (non-choked) flow.

In an advantageous embodiment of the invention the means for controlling the rotational speed of the first turbine comprises a variable gas flow guiding means arranged upstream of at least one row of compressor blades of the first compressor, wherein the variable gas flow guiding means is adapted to guide the gas flow such as to influence the rotational speed of the first compressor. This way also the rotational speed of the first turbine is influenced since they are rotationally rigidly connected.

For instance, the guiding means can be used to go from a slight co-swirl to a slight counter-swirl of the inlet flow to the at least one row of compressor blades of the first compressor. This means that the rotational speed of the first compressor, and thus of the first shaft and the first turbine, will decrease. Due to the arrangement of the first turbine, e.g. the absence of a conventional turbine inlet stator, also the gas flow rate through the engine will decrease.

Preferably, the variable gas flow guiding means comprises a set of variable gas flow guide vanes. Guide vanes of this type are known as such and are therefore easy to adapt to the invention.

That "the variable gas flow guiding means is adapted to guide the gas flow such as to influence the rotational speed of the first compressor" means that said means is capable of influencing the degree of swirl of the gas that, during operation of the engine, flows through the first compressor, or at least of the gas that flows towards the at least one row of compressor blades positioned downstream of the guiding means. A skilled person in the art realizes that this, for instance, means that there should not be any other components arranged between the guiding means and the compressor blades that would significantly reduce the guide means' capability of influencing the swirl of the gas that flows towards these compressor blades. This capability is in some ways similar to the capability of conventional variable compressor guide vanes. Such conventional guide vanes are, however, mainly used for controlling the compressor stability, whereas the guiding means of the present invention is controlled in a different way for controlling the rotational speed of the first compressor.

In an advantageous embodiment of the invention the at least one row of turbine blades of the first turbine is arranged longitudinally adjacent to the combustion chamber. This means that the turbine rotor is arranged directly downstream of the combustion chamber and further clarifies that no stator vanes (nozzle blades) or similar gas deflecting components are arranged in a region downstream of the combustion chamber and upstream of the first turbine. Thus, the gas turbine engine is arranged to avoid any significant deflection of a gas flow that, during operation of the gas turbine engine, flows in this region.

In an advantageous embodiment of the invention the gas turbine engine comprises a second compressor and a second turbine rotationally rigidly connected by a second shaft, wherein the second compressor is arranged upstream of the combustion chamber, wherein the second shaft is arranged concentrically in relation to the first shaft and wherein the second turbine is positioned downstream of the first turbine. This way the efficiency and power output of the gas turbine engine can be increased. Preferably, the second shaft is arranged to rotate in an opposite direction in relation to the first shaft to increase the efficiency.

In an advantageous embodiment of the invention the second compressor is arranged upstream of the first compressor. Such a design makes it possible to reduce component stress and to use a simpler bearing arrangement.

In an advantageous embodiment of the invention the first compressor comprises a case arranged to rotate around the second compressor, which case is provided with a plurality of rows of compressor blades protruding in an inward direction towards the second compressor, wherein the first compressor and the second compressor overlap. Such a counter-rotating compressor makes it possible to provide a higher pressure ratio with fewer airfoils.

In an advantageous embodiment of the invention the second compressor extends in an axial direction over a longer distance than the first compressor such that the first and second compressors overlap only partly. Preferably, the second compressor has a plurality of rows of compressor blades positioned upstream of the most upstream row of compressor blades of the first compressor. A fully overlapping counter-rotating compressor is difficult to run at part speed since only one row of variable guide vanes can be provided, i.e. at the inlet. By arranging the counter-rotating compressor in a partly overlapping manner it becomes possible to provide the compressor with further rows of (non-inlet) variable guide vanes which is important for the stability of the compressor if a higher pressure ratio is desired.

In such a counter-rotating compressor, the variable gas flow guiding means is preferably positioned upstream of the first compressor and downstream of said plurality of rows of compressor blades positioned upstream of the most upstream row of compressor blades of the first compressor.

In an advantageous embodiment of the invention a first rotor arrangement is attached to a first carrying frame positioned downstream of the first compressor and upstream of the combustion chamber, wherein the first rotor arrangement comprises the first compressor, the first shaft and the first turbine. Where overlapping compressor are used the first rotor arrangement is preferably also attached to a second carrying frame that is positioned upstream of the first compressor. This allows for a working bearing arrangement without intershaft bearings. The variable gas flow guiding means is preferably attached to the second carrying frame.

Preferably, the radius of a gas turbine engine core is less along a distance where the first compressor and the second compressor overlap than upstream of the first compressor. Preferably, the radius of the gas turbine engine is reduced, as seen in a downstream direction, at or around the second carrying frame. Such a design allows the stator-rotor stages upstream of the first compressor to run sufficiently fast, i.e. to run at a sufficiently high Mach number, to provide a high pressure ratio per stage, while the downstream stages, where counter-rotation is applied, are allowed to run sufficiently slow to avoid excessive shock losses.

In an advantageous embodiment of the invention the turbine blades of the first turbine have an outlet blade angle of at least 60°. The outlet blade angle should be sufficiently large for providing a sufficiently small area between the blades to reduce the flow rate sufficiently when the turbine is retarded. Preferably, the turbine blades of the first turbine have a camber of around 45° or lower. To maximize the gas flow when the first turbine is only lightly loaded, e.g. by an appropriate setting of the variable inlet guide vanes of the compressor, the profile of the turbine blades should have a low amount of camber.

In an advantageous embodiment of the invention the means for controlling the rotational speed of the first turbine comprises an arrangement for taking out mechanical power from the first shaft. This can be used as an alternative or in combination with the variable gas flow guiding means. Preferably, the arrangement for taking out mechanical power comprises an electric generator connected to the first shaft.

The invention also concerns a method for controlling a gas flow rate in an axial flow gas turbine engine. The inventive method comprises the step of: controlling a rotational speed of a turbine, wherein the turbine is adapted to influence the gas flow rate through the gas turbine engine depending on the rotational speed of the turbine.

In an advantageous embodiment of the inventive method it comprises the step of: adjusting a variable gas flow guiding means arranged upstream of at least one row of compressor blades of a compressor that is rotationally rigidly connected to the turbine. Preferably, it comprises the step of: decreasing the rotational speed of the turbine by adjusting the variable gas flow guiding means such as to increase a counter-swirl, or decrease a co-swirl, of the gas flow.

In an advantageous embodiment of the inventive method it comprises the step of: taking out mechanical power from a shaft that is rotationally rigidly connected to the turbine.

The invention also concerns an axial flow gas turbine engine comprising a first rotor arrangement comprising a first compressor, and a second rotor arrangement comprising a second compressor, wherein the first and second rotor arrangements are positioned concentrically and are arranged to rotate in opposite directions, and wherein the first compressor comprises a case arranged to rotate around the second compressor, which case is provided with a plurality of rows of compressor blades protruding in an inward direction towards the second compressor, wherein the first compressor and the second compressor overlap. In the invention the second compressor extends in an axial direction of the gas turbine engine over a longer distance than the first compressor such that the first and second compressors overlap only partly. As mentioned above, such a partly overlapping, counter-rotating compressor arrangement makes it possible to provide the compressor with further rows of (non-inlet) variable guide vanes which is important for the stability of the compressor if a higher pressure ratio is desired. A gas turbine engine provided with such a compressor arrangement is useful in various applications.

BRIEF DESCRIPTION OF DRAWINGS

In the description of the invention given below reference is made to the following figures, in which.

DETAILED DESCRIPTION

Figure 1:
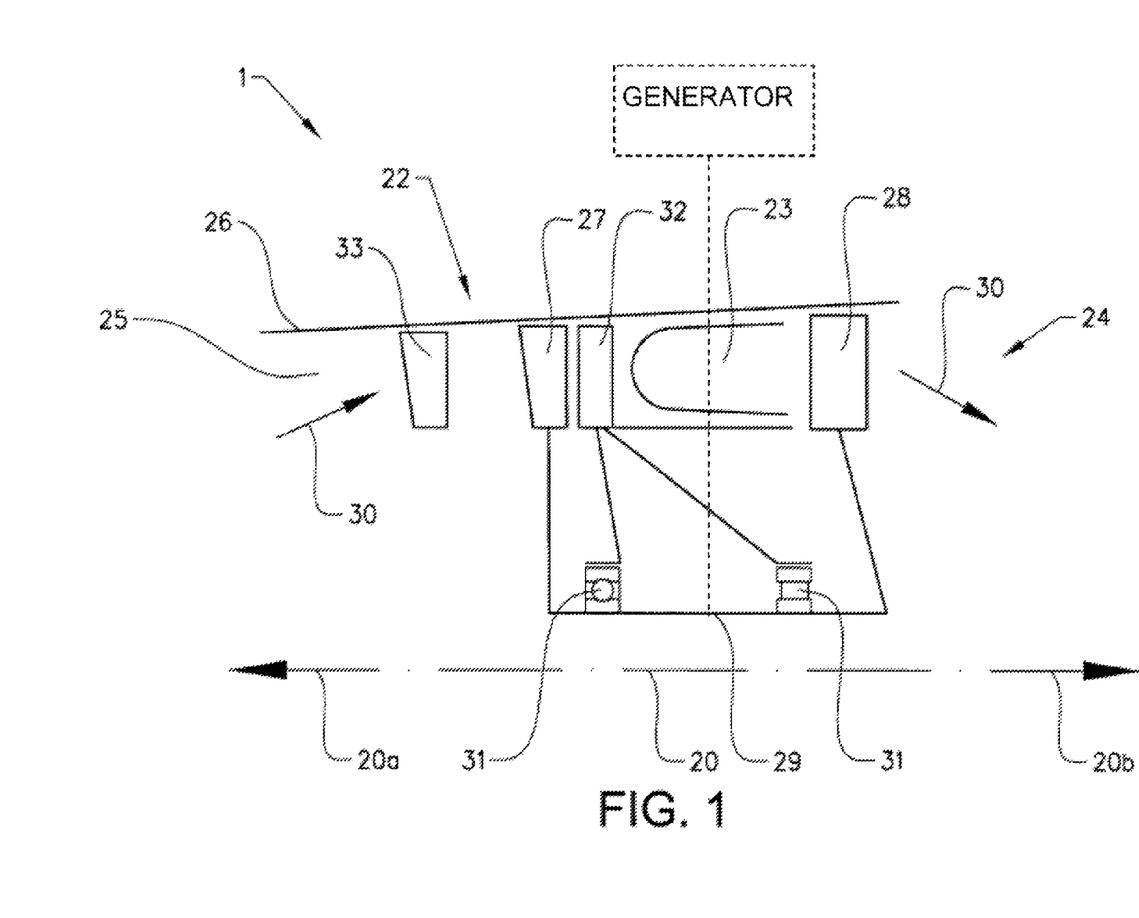
FIG. 1 shows, in a schematic view, a first preferred embodiment of a gas turbine engine according to the invention.

FIG. 1 shows, in a schematic view, a first embodiment of the invention. FIG. 1 focuses on the most important parts and shows an inventive gas turbine engine 1 in its simplest form. A compressor 22, a combustion chamber 23 and a turbine 24 are arranged in an engine core 25 of the gas turbine engine 1. A casing 26 defines the engine core 25. The compressor 22 has one row of compressor blades 27 circumferentially arranged around the compressor 22 and the turbine 24 has one row of turbine blades 28 circumferentially arranged around the turbine 24. The compressor 22 and the turbine 24 are operatively connected via a shaft 29 that is concentrically arranged around a longitudinal axis or centerline 20 of the gas turbine engine 1. The longitudinal axis 20 extends in an upstream direction 20a and in a downstream direction 20b. A set of variable inlet guide vanes 33 is positioned upstream of the compressor blades 27.

The compressor 22, the shaft 29 and the turbine 24 form a rotor arrangement that, via bearings 31, is attached to and carried by a compressor rear frame (CRF) 32 positioned between the compressor 22 and the combustion chamber 23.

The row of turbine blades 28 of the turbine 24 is positioned downstream of and longitudinally adjacent the combustion chamber 23. With the expression "longitudinally adjacent" is meant that there are no other rotor blade rows and/or stator vane rows between the named longitudinally adjacent components. Another way to express this is to say that the row of turbine blades 28 is positioned directly downstream of the combustion chamber 23.

It may be noted that FIG. 1 only shows an upper half of the engine core 25 of the gas turbine engine 1. The arrangement of the engine core 25 is roughly similar (mirror inverted) below the centerline 20. This is valid for all figures of the same type in this document.

A core gas flow is indicated by arrows 30. In a conventional manner, the core gas flow is compressed when passing the compressor 22 (and any further compressors), mixed with fuel and subjected to combustion in the combustion chamber 23, and used to drive one or several turbines downstream the combustion chamber 23, which turbines drive their corresponding compressor or fan. A by-pass gas (air) flow may be arranged in a conventional manner outside of the core delimiting member 26. This is valid for all embodiments of the invention.

A main function of the inlet guide vanes 33, the compressor 22, the shaft 29 and the turbine 24 shown in FIG. 1 is to make it possible to control the gas flow rate through the engine core 25. Thereby it is possible to control the pressure ratio and thus to shift the operating of the compressors) between different operating lines. This means that the engine core 25 can be used to make a variable cycle gas turbine engine. Control of the gas flow rate through the engine core 25 is accomplished by controlling the rotational speed of the shaft 29.

With the term "gas flow rate" it is in this document meant the normalized gas flow that is proportional to the ratio between the axial flow velocity and the sound velocity at the stagnation temperature. This normalized gas flow rate is neither equal, to the flow velocity (m/s) nor to the mass flow rate (kg/s). Because the temperature varies less than the pressure it may be noted that the invention influences the gas flow velocity more than the mass flow rate. It may also be noted that the amounts of fuel supplied to the combustion chamber influences the mass flow rate more than the gas flow velocity.

There are some important differences in design between the gas turbine engine 1 shown in FIG. 1 and conventional gas turbines. In a conventional gas turbine engine the main purpose of the turbine(s) is to extract as much energy as possible of the gas flow and convert this to mechanical (rotational) energy. For this purpose, a conventional gas turbine engine is provided with nozzle blades (stator vanes) between the combustion chamber and the turbine rotor for swirling the flow into the latter so as to increase the power output of the turbine and with turbine blades that, in cooperation with the inlet stator, is particularly adapted to generate rotation of the turbine and its corresponding shaft. In contrast, in the system described here the main purpose of the turbine 24 and its blades 28 is not only to generate a turbine power output but also to facilitate the control of the gas flow rate through the engine core 25.

An example of such a design difference is that the turbine 24 is not associated with any inlet stator; the turbine 24 is statorless. Thus, in the example shown in FIG. 1 there is no inlet stator arranged upstream of the turbine blades 28. This way the gas will, to a large extent, flow in an axial direction when reaching the turbine blades 28. By arranging the gas turbine engine 1 in this way the capability of the turbine 24 to generate rotational power is reduced but, on the other hand, it allows the rotation rate of the turbine 24 to have an effect on the gas flow rate through the same.

A conventional turbine inlet stator positioned upstream of the turbine 24, which stator normally is considered to form a part of the turbine, redirects the flow in a tangential direction, i.e. it swirls the flow, towards the turbine rotor blades such as to rotate the turbine as efficient as possible and such as to generate a choked gas flow. A rotor downstream of a point where the gas flow becomes choked can not affect the gas flow rate. Further, even if the flow is not choked the capability of a downstream rotor to have an effect on the gas flow rate is enhanced if the flow is more axially than tangentially directed.

Figure 2:
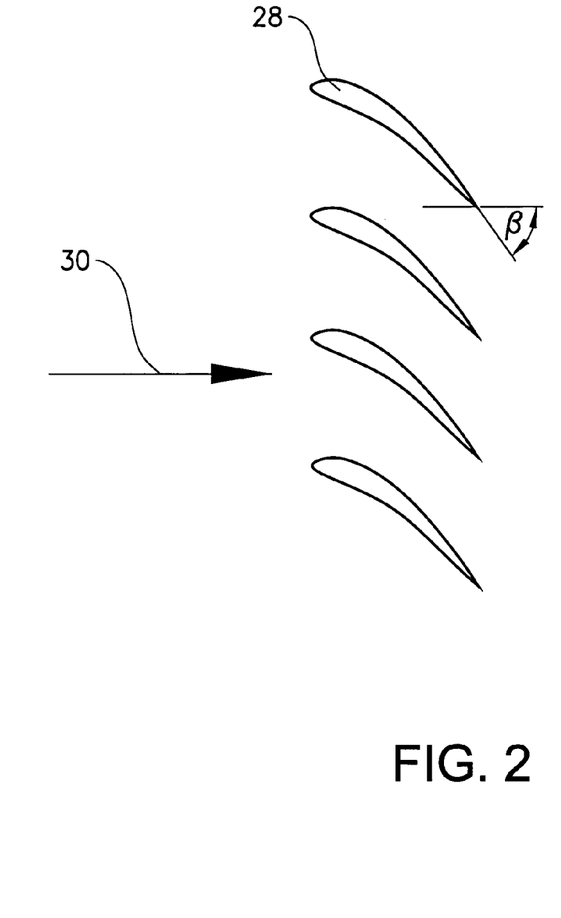
FIG. 2 shows the profile of the turbine blades of the turbine shown in FIG. 1.
Figure 3:
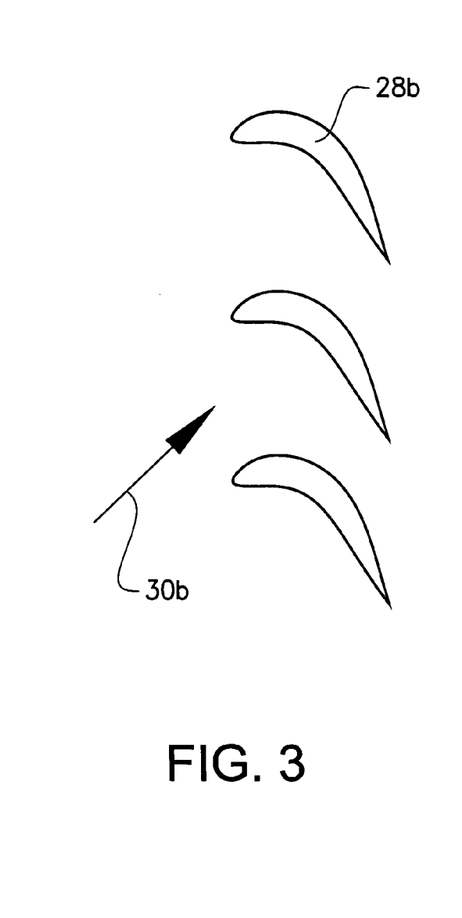
FIG. 3 shows the profile of conventional turbine blades.

A further design difference between the engine 1 shown in FIG. 1 and most conventional gas turbines is the profile of the turbine blades 28. FIG. 2 shows a profile of the turbine blades 28. The direction of an axially directed gas flow is indicated by an arrow 30. FIG. 3 shows a profile of typical turbine blades 28b for use in a gas turbine engine. The direction of a partially tangentially directed gas flow, as redirected by a turbine stator, is indicated by an arrow 30b. By comparing FIGS. 2 and 3 it can be seen that the profile of the different types of turbine blades 28, 28b differ.

The profile of the conventional turbine blades 28b shown in FIG. 3 is designed to be effective when the flow has been subject to a considerable tangential deflection (achieved by the turbine stator). Such conventional turbine blades 28b are strongly cambered and can let through only a slightly larger flow irrespective of the flow inlet velocity or angle. Principally, such blades 28b could be used in the invention but the magnitude of the gas flow variation, i.e. the ratio between the largest and the smallest gas flow rate when the rotation rate of the first turbine 24 is varied, will be rather small.

The profile of the turbine blades 28 is designed to facilitate the control of the gas flow rate in that it provides little blockage to allow a large maximum gas flow rate. The outlet blade angle $\beta$ (see FIG. 2) should be sufficiently large for providing a sufficiently small area between the blades 28 to reduce the flow rate sufficiently when the turbine 24 is retarded. If the shaft 29, hypothetically, is brought to standstill during operation of the gas turbine engine 1, the effective flow area through the turbine 24, i.e. through the row of turbine blades 28, is approximately $\cos \beta$ of an annular engine core 25 area around the turbine 24 (provided that the length of the blades 28 is equal to or longer than the distance between the blades 28). If the turbine 24 is running free, i.e. if the turbine 24 runs with a speed adapted to the gas flow so that no (or only a very small) transfer of energy occurs between the turbine blades 28 and the gas flow, and if the turbine blades 28 are thin and straight, the effective flow area approaches the annular core area. The gas flow rate through the engine core 25 can thus be varied by varying the rotational speed of the turbine 24/turbine shaft 29. At least in theory, the gas flow rate can be varied between at most as 1: $\cos \beta$ by varying the rotational speed of the turbine shaft 29 between the above described end points (standstill and running free). Theoretically, if a variation of a factor of at least 2 is desired then $\beta$ must be at least 60° (since $\cos 60°=0.5$). Preferably, the outlet blade angle $\beta$ of the turbine blades 28 is even larger.

To maximize the gas flow when the turbine 24 is only lightly loaded by an appropriate setting of the variable inlet guide vanes 33 of the compressor, the profile of the turbine blades 28 should have a low amount of camber and a small thickness, i.e. a lower amount of camber and a smaller thickness than the blades 28b shown in FIG. 3. A suitable camber is around 45° or lower, but this depends also on the application.

A further difference, although more of a functional than of a design character, between the engine 1 shown in FIG. 1 and most conventional gas turbines is the set of variable inlet guide vanes 33 positioned upstream of the compressor blades 27, which guide vanes 33 are arranged to guide the gas flow such as to influence the rotational speed of the compressor 22, and thus of the shaft 29 and the turbine 24. Primarily, the guide vanes 33 are used to reduce the gas flow rate such as to move the operation of the compressor 22 to a higher operating line, i.e. a higher pressure at a given gas flow rate. In order to reduce the gas flow rate, the variable inlet guide vanes 33 are controlled such as to increase the counter-swirl (which is the same as to decrease the co-swirl) of the inlet flow to the compressor stage in question, i.e. in this example the single row of compressor blades 27. Increasing the counter-swirl of this inlet flow has the effect that the compressor 22 adds more work (energy) to the gas flow at the same rotational speed. The increased work will cause the compressor 22 to absorb more torque than the corresponding turbine 24 provides via the shaft 29. Thus the whole rotor arrangement, i.e. the compressor 22, the shaft 29 and the turbine 24, will slow down. At this lower rotational speed the statorLess turbine 24 can no longer accept the same amount of gas flow and thus throttles the compressor to provide a flow at a higher pressure and a lower flow rate. This change is thus raising the operating line of the compressor 22.

Variable compressor guide vanes, i.e. variable compressor stators, as such are well known. However, in the inventive gas turbine engine the variable inlet guide vanes 33, and corresponding guide vanes in the other embodiments, are operated in a way that differs from conventional operation which gives them another function. Roughly, the difference lies in which angle the guide vanes 33 are positioned at a certain rotational speed of the rotor. Conventionally, such stators are set in an open position at a high or full rotor speed and in a closed, co-swirling position at lower rotor speed. In the present invention the stators related to the invention, e.g. the variable inlet guide vanes 33, are set in an open position or in a counter-swirl position at any rotor speed. The conventional function is mainly to control the stability of the compressor, and the inventive gas turbine is preferably provided also with variable guide vanes performing a stability function. The function of the variable guide members related to the present invention is instead mainly to control the energy transfer in the compressor stage downstream of the guide vanes.

The compressor 22 and/or the turbine 24 shown in FIG. 1 may be of multistage type, i.e. they may comprise a plurality of blade rows. Of importance is that the variable guide vanes 33 are positioned upstream of at least one row of compressor blades and that at least the first row of turbine blades, i.e. the row of turbine blades positioned most upstream, is capable of influencing the gas flow rate as described above.

The gas turbine engine 1 schematically shown in FIG. 1 may very well be provided with further turbines, shafts and compressors in order to increase the efficiency and power output, or to drive an external load or a propulsive fan, such as to make a turbofan engine.

Figure 4:
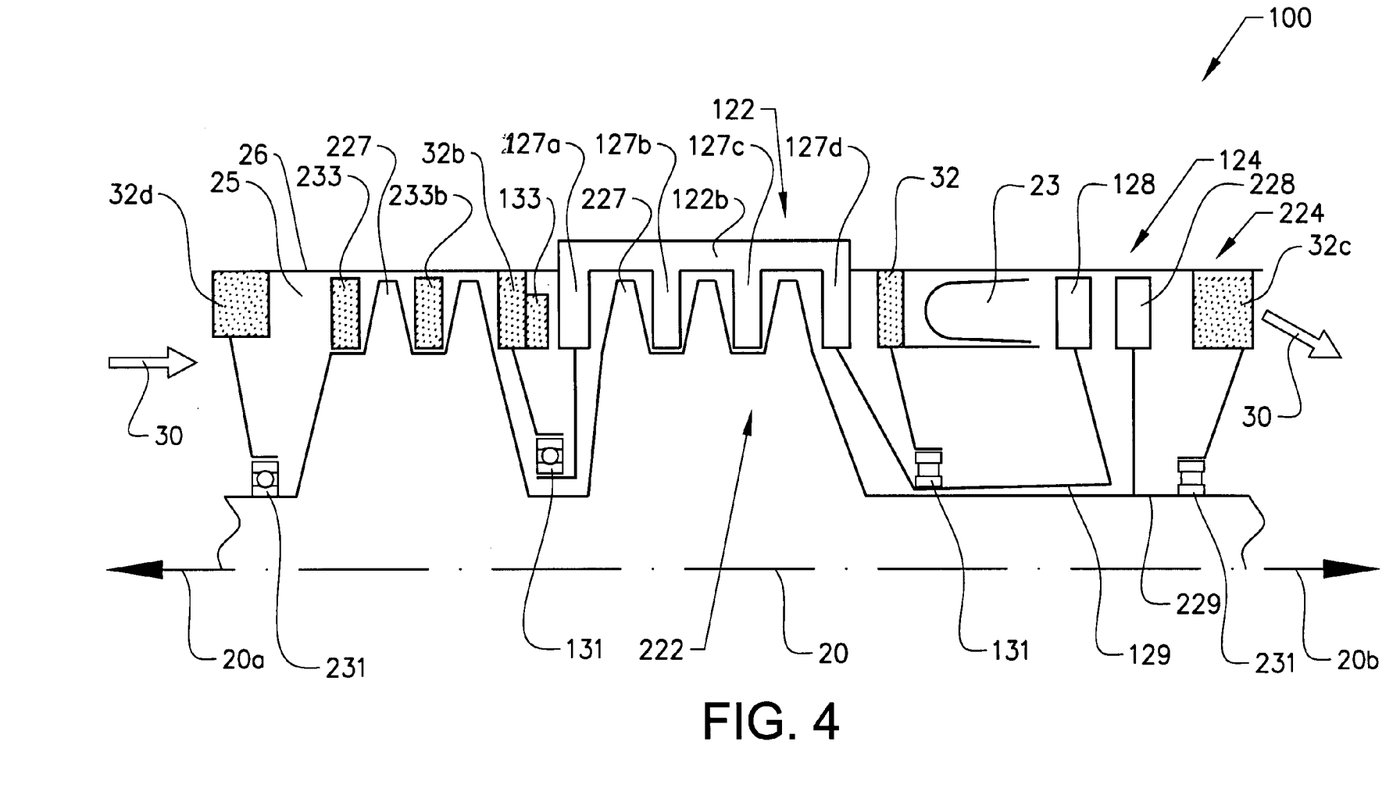
FIG. 4 shows, in a schematic view, a second preferred embodiment of a gas turbine engine according to the invention.

FIG. 4 shows a second embodiment of the inventive gas turbine engine. In this case the gas turbine engine 100 comprises two counter-rotating rotor arrangements, i.e. the rotor arrangements are arranged to be rotating in opposite directions. A first rotor arrangement comprises a first compressor 122 and a first turbine 124 operatively connected via a first shaft 129. This first rotor arrangement corresponds to the rotor arrangement shown in FIG. 1. A second rotor arrangement comprises a second compressor 222 and a second turbine 224 operatively connected via a second shaft 229. The two shafts 129, 229 are arranged concentrically around the centerline 20.

In similarity with FIG. 1, a casing 26 encloses the components described and defines an engine core 25. Also the arrangement around the longitudinal axis 20 is similar.

The first rotor arrangement is, via bearings 131, attached to the compressor rear frame (CRF) 32 (rear/downstream part of first rotor arrangement) and to a compressor mid frame (CMF) 32b (front/upstream part of first rotor arrangement). The second rotor arrangement is, via bearings 231, attached to a turbine mid frame (TMF) 32c (rear/downstream part of second rotor arrangement) and to an intermediate case (IMC) 32d (front/upstream part of second rotor arrangement). Thus, the counter-rotating rotor arrangements are carried by four frames: IMC, CMF, CRF and TMF, ordered in a downstream direction. The IMC 32d is located upstream of the second compressor 222. The CMF 32b is located upstream of the first compressor 122 and roughly midways downstream along the second compressor 222. The CRF 32 is located between the combustion chamber 23 and the first compressor 122. The TMF 32c is located downstream of the second turbine 224.

The turbine section of the first rotor arrangement is similar to what is shown in FIG. 1, i.e. the first turbine 124 has one row of turbine blades 128 circumferentially arranged around the first turbine 124. For reasons described above, the turbine blades 128 are positioned longitudinally adjacent the combustion chamber 23, i.e. there are no stator vanes or rotor blades located between the combustion chamber 23 and the blades 128 of the first turbine 124.

The first compressor 122 has four rows of circumferentially arranged compressor blades 127a, 127b, 127c, 127d. The first, upstream row of compressor blades 127a is used to carry a rotating case or sleeve 122b that holds the subsequent, downstream compressor blades 127b, 127c, 127d. The rotating case 122b is arranged to rotate around a downstream part of the second compressor 222, wherein the gas is intended to flow between the rotating case 122b and the second compressor 222. The compressor blades 127a, 127b, 127c, 127d thus protrude from the rotating case 122b in an inward direction towards the second compressor 222.

The first compressor 122 extends upstream from the CRF 32 only partly along the second compressor 222, so that the two compressors 122, 222 overlap only partly. A first set of variable inlet guide vanes 133 is positioned upstream of the first compressor 122, i.e. upstream of all its rows of compressor blades 127, onto the CMF 32b in the form of movable flaps.

The second compressor 222 extends further upstream compared to the first compressor 122 and is provided with a plurality of rows of compressor blades 227, i.e. a plurality of compressor stages, both downstream and upstream of the CMF 32b. Between the CMF 32b and the CRF 32, each of the three sets or rows of second compressor blades 227 are positioned between two rows of first compressor blades 127a, 127b, 127c, 127d. A second set of variable inlet guide vanes 233 is positioned upstream of the first compressor 222. A set of variable (non-inlet) guide vanes 233b is also positioned between the two rows of compressor blades 227 upstream of the CMF 32b. The purpose of these two sets of guide vanes 233, 233b is to allow stable and efficient part speed operation.

The main purpose of the second turbine 224 is to generate rotational energy (which can be used for various purposes) and therefore the turbine blades 228 of the second turbine 224 have profiles in line with what is shown in FIG. 3. Stator vanes (not shown) are positioned between the first and second turbines 124, 128.

In similarity to what is described in relation to FIG. 1 a main purpose of the first turbine 124 and its blades 128 is, besides generating turbine power output, to facilitate the control of the gas flow rate through the engine core 25. The first turbine 124 is therefore designed in the same way as the turbine 24 in FIG. 1.

Both the first and the second compressors 122, 222 are useful for compressing the gas (air) flow on its way downstream in the engine core 25.

A main function of the first set of variable inlet guide vanes 133, the first compressor 122, the first shaft 129 and the first turbine 124 is, in similarity with what is described in relation to FIG. 1, to make it possible to control the gas flow rate through the engine core 25. This has the same effects and is carried out in the same way as described above, i.e. the inlet guide vanes 133 are used to influence the rotational speed of the first rotor arrangement which has an effect on the pressure ratio.

The gas turbine engine 100 shown in FIG. 4 uses a fully counter-rotating turbine and compressor to provide a high pressure ratio with fewer airfoils. The counter rotating first and second compressors 122, 222 overlap only partly so that the variable inlet guide vanes 133 intended for the first compressor 122 are located around halfway down the second compressor 222. By arranging the counter-rotating compressors 122, 222 with a partly or halfway overlap the following two problems are solved: 1) The statorless turbine 124 can not provide the same amount of work as a turbine with stator; the overlapping provides for a higher pressure ratio. 2) A fully overlapping counter-rotating compressor is difficult to run at part speed since only one row of variable guide vanes can be provided, i.e. at the inlet. By arranging the counter-rotating compressor in a partly overlapping manner it becomes possible to provide the compressor with further rows of (non-inlet) variable guide vanes which is important for the stability of the compressor if a higher pressure ratio is desired.

Figure 5:
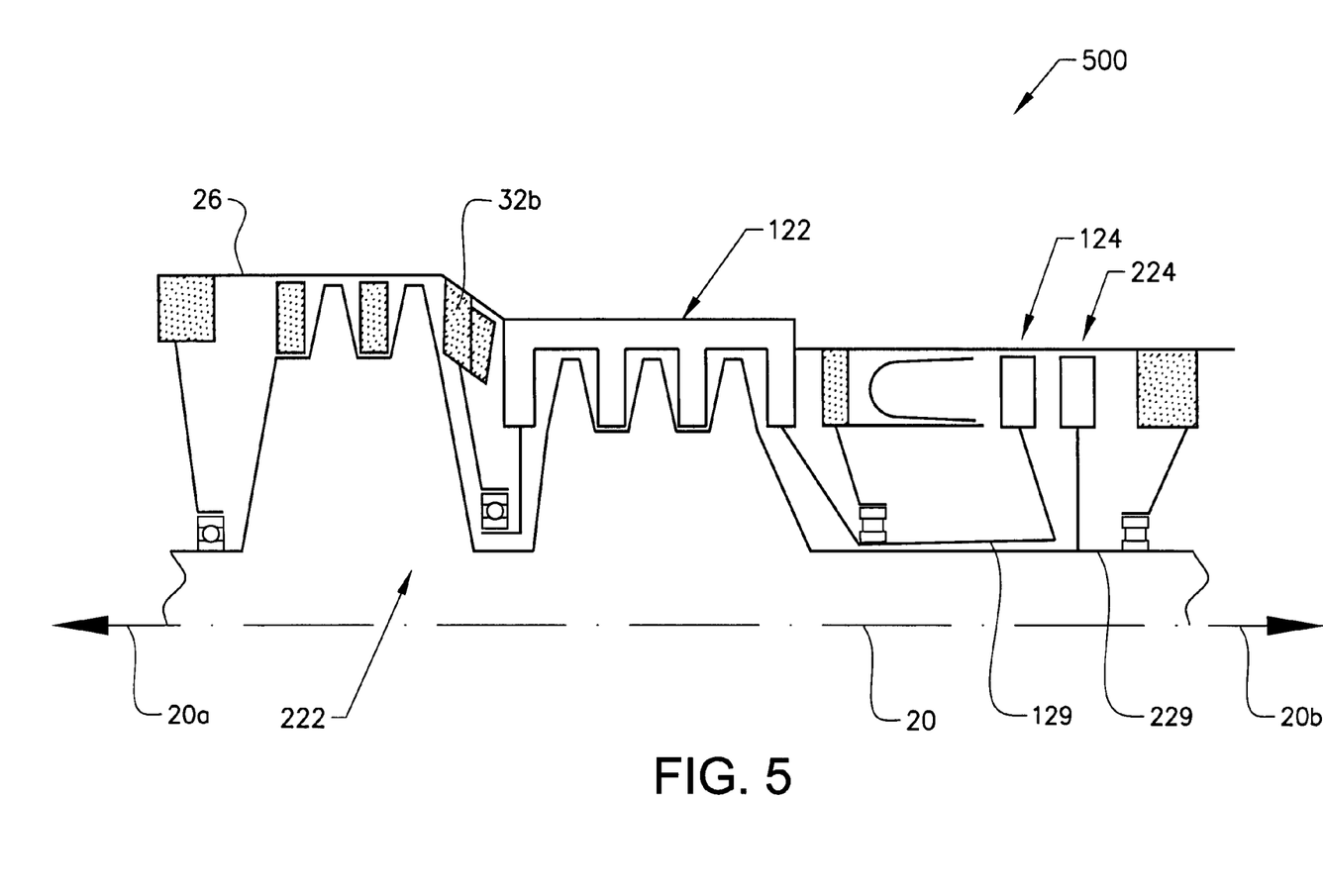
FIG. 5 shows, in a schematic view, a third preferred embodiment of a gas turbine engine according to the invention.

FIG. 5 shows, in a schematic view, a third preferred embodiment of a gas turbine engine 500 according to the invention. The difference between the third embodiment and the second embodiment shown in FIG. 4 is that the radius of the engine core 25 decreases, seen in a downstream direction, at or around the CMF 32b. In other words, the radius of the engine core 25, i.e. the distance between the longitudinal axis 20 and the casing 26, is less along a distance where the first compressor 122 is positioned and counter-rotation is applied than upstream of the first compressor 122. This design allows the stator-rotor stages upstream of the CMF 32b and the first compressor 122 to run sufficiently fast, i.e. to run at a sufficiently high Mach number, to provide a high pressure ratio per stage, while the stages downstream of the CMF 32b, where counter-rotation is applied, are allowed to run sufficiently slow to avoid excessive shock losses. This phenomenon is partly handled even with a constant engine core radius (FIG. 4) as the temperature rises through the compressors) which reduces the Mach numbers for the rear (downstream) stages, but a radius change can provide for more optimal conditions. An additional advantage with a radius decrease is that the rear stages will have a lower hub to tip radius ratio and longer blades than for a constant radius design. This decreases flow losses at shroud and tip as well as the tip leakage and thus increases stage efficiency.

How much the engine core radius should differ between the upstream part and the downstream part of the compressor section depends on the application.

Figure 6:
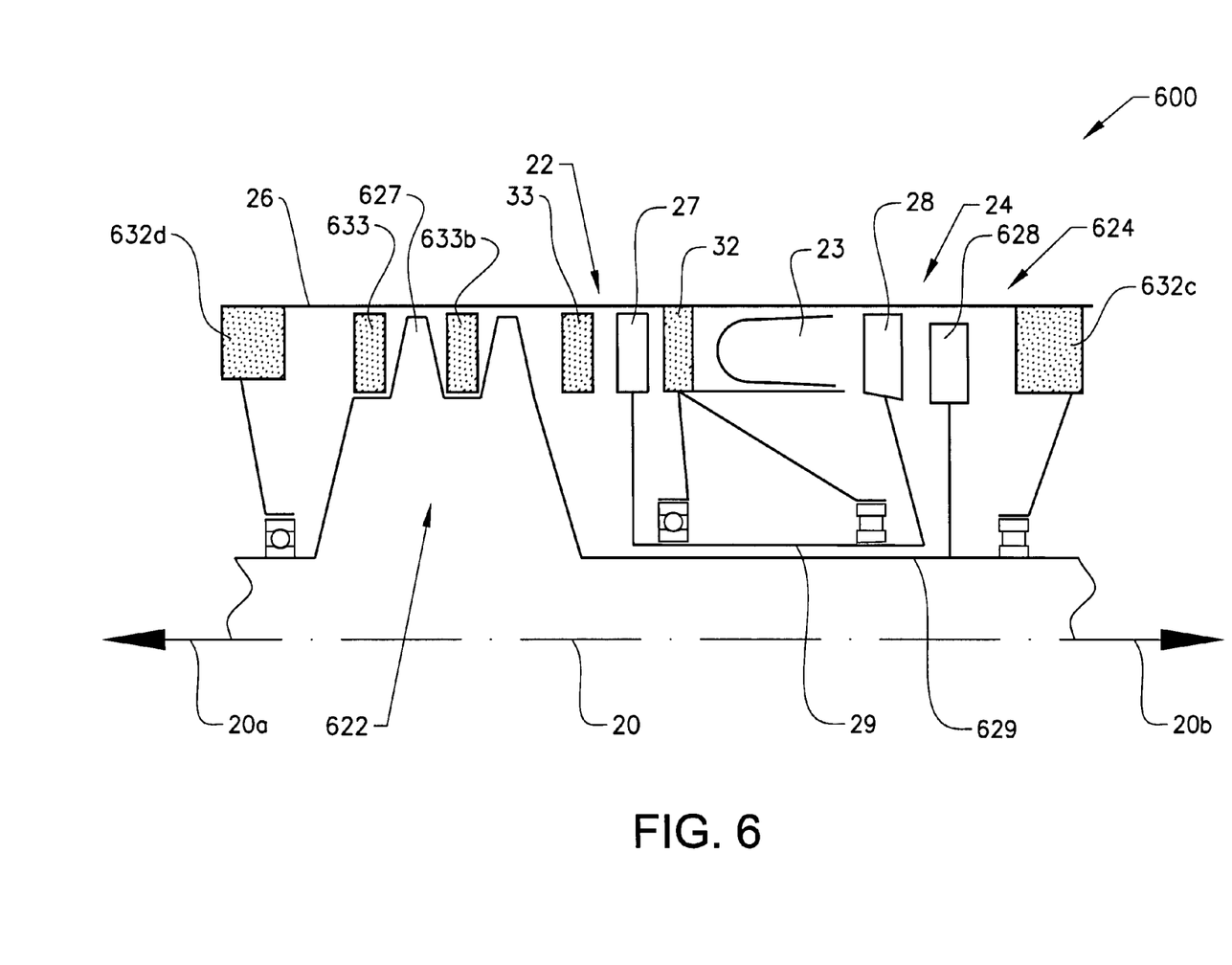
FIG. 6 shows, in a schematic view, a fourth preferred embodiment of a gas turbine engine according to the invention.

FIG. 6 shows, in a schematic view, a fourth preferred embodiment of a gas turbine engine 600 according to the invention. Generally, the stress on the rotating casing 122b (see FIG. 4) limits the speed of the counter-rotating rotor for a multistage counter-rotating machine. To avoid this, a single stage counter-rotating compressor can be used. In such a case a simpler bearing arrangement without a compressor mid frame (CMF) 32b can be used. FIG. 6 shows an example of such a type of gas turbine engine.

In FIG. 6 the variable inlet guide vanes 33, the first rotor arrangement (i.e. the first compressor 22, the first shaft 29 and the first turbine 24) and its attachment points, the engine core casing 26 etc. are similar to what is shown in FIG. 1. In similarity to the embodiments shown in FIGS. 4 and 5, the embodiment shown in FIG. 6 includes a second compressor 622 and a second turbine 624 with turbine blades 628. The first and second compressors 22, 622 counter-rotate but do not overlap in this example. The second compressor 622 is placed upstream of the first compressor 22 and is attached to the casing 26 at the IMC 632d and at the TMF 632c in similarity to what is shown in FIG. 4. The gas turbine engine 600 shown in FIG. 6 works in the same principal manner as described above.

Figure 7:
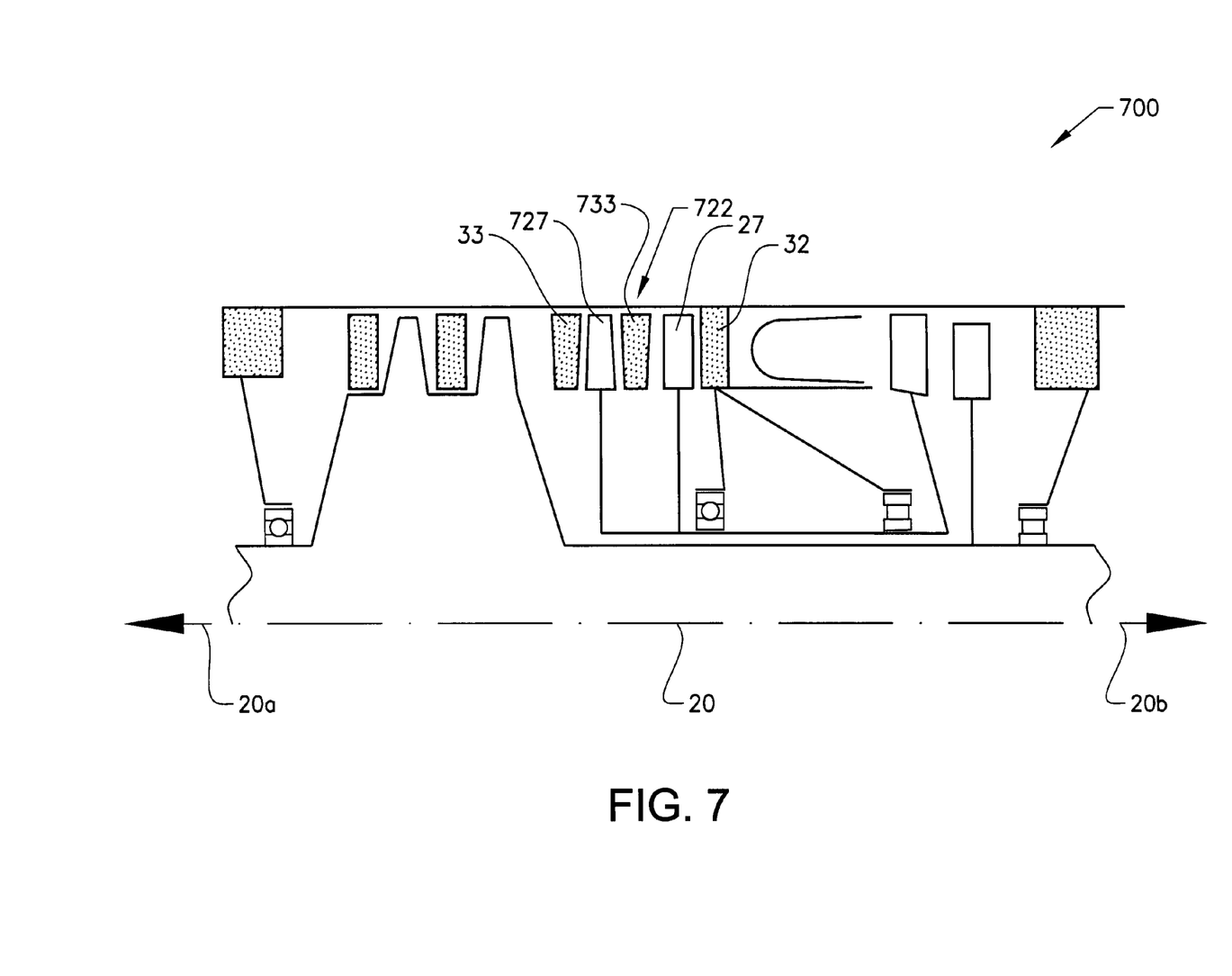
FIG. 7 shows, in a schematic view, a fifth preferred embodiment of a gas turbine engine according to the invention.

FIG. 7 shows, in a schematic view, a fifth preferred embodiment of a gas turbine engine 700 according to the invention. This is a variant of the embodiment shown in FIG. 6 and the components are to a large extent the same. In this example the first counter-rotating compressor 722 is a two-stage compressor comprising an additional row of compressor blades 727, which first compressor 722 is conventionally configured without any rotating case (in contrast to the embodiment shown in FIG. 4). An additional variable guide vane 733 is positioned between the rows of compressor blades 27, 727.

Also the gas turbine engines schematically shown in FIGS. 4-7 may very well be provided with e.g. further rows of compressor and turbine blades, stators between turbine rows, as well as further turbines, shafts and compressors, for instance a low pressure (LP) shaft connecting an LP-compressor and an LP-turbine.

It should be pointed out that the figures shown are schematic. For instance, the case 122b shown in FIGS. 4 and 5 has been given a much larger thickness than the casing 26 to show that this is a separate part that is rotationally movable in relation to the casing 26. However, the case 122b can also be regarded as forming part of the casing 26 since these two casing components together defines the engine core 25. Further, the variable guide vanes are attached directly or indirectly to the casing 26 by known means.

With the expression that two compressors "overlap" it is meant that at least one of the compressors has at least two rows of compressor blades which are positioned upstream and downstream, respectively, of a row of compressor blades of the other compressor.

The invention is applicable in general to axial flow gas turbine engines, i.e. both to gas turbine engines arranged for propulsion of an aircraft as well as to gas turbine engines arranged for other purposes.

The invention is not limited by the embodiments described above but can be modified in various ways within the scope of the claims. For instance, the means for controlling the rotational speed of the first turbine 24, 124 does not necessarily have to include variable gas flow guiding means that affects the rotational speed of the corresponding compressor 22, 122. Alternatively, or in combination, the means for controlling the rotational speed can comprise an arrangement for taking out mechanical power from the corresponding shaft 29, 129. An example of such an arrangement is an electric generator connected to the shaft 29, 129, which generator can be used to produce electricity while slowing down the rotation of the shaft/turbine.

The figures show working bearing arrangements for counter-rotating rotors without intershaft bearings. This is an advantage in that high relative rotational speeds are avoided in the bearing. However, the invention does not require that the rotor arrangements are attached to bearings and carrying frames in the same way as described above.

The invention claimed is:

1. Gas turbine engine comprising in serial flow relationship:
    a first compressor provided with at least one row of compressor blades distributed circumferentially around the first compressor;
    a combustion chamber; and
    a first turbine provided with at least one row of turbine blades distributed circumferentially around the first turbine, wherein the first compressor and the first turbine are rotationally rigidly connected by a first shaft,
    wherein the first turbine is adapted to influence a normalized gas flow rate through the gas turbine engine depending on a rotational speed of the first turbine, wherein a turbine rotor of the first turbine is arranged directly downstream of the combustion chamber so that no stator vanes or similar gas deflecting components are arranged in a region downstream of the combustion chamber and upstream of the first turbine rotor, and the gas turbine engine further comprises means for controlling the rotational speed of the first turbine, and wherein there is no inlet stator associated with the first turbine.

2. Gas turbine engine according to claim 1, wherein the means for controlling the rotational speed of the first turbine comprises a variable gas flow guiding means arranged upstream of at least one row of compressor blades of the first compressor, wherein the variable gas flow guiding means is adapted to guide the gas flow such as to influence the rotational speed of the first compressor.

3. Gas turbine engine according to claim 2, wherein the variable gas flow guiding means comprises a set of variable gas flow guide vanes.

4. Gas turbine engine according to claim 1, wherein the at least one row of turbine blades of the first turbine is arranged longitudinally adjacent to the combustion chamber.

5. Gas turbine engine according to claim 1, wherein it comprises a second compressor and a second turbine rotationally rigidly connected by a second shaft, wherein the second compressor is arranged upstream of the combustion chamber, wherein the second shaft is arranged concentrically in relation to the first shaft and wherein the second turbine is positioned downstream of the first turbine.

6. Gas turbine engine according to claim 5, wherein the second shaft is arranged to rotate in an opposite direction in relation to the first shaft.

7. Gas turbine engine according to claim 5, wherein the second compressor is arranged upstream of the first compressor.

8. Gas turbine engine according to claim 6, wherein the first compressor comprises a case arranged to rotate around the second compressor, which case is provided with a plurality of rows of compressor blades protruding in an inward direction towards the second compressor, wherein the first compressor and the second compressor overlap.

9. Gas turbine engine according to claim 8, wherein the second compressor extends in an axial direction over a longer distance than the first compressor such that the first and second compressors overlap only partly.

10. Gas turbine engine according to claim 8, wherein the second compressor has a plurality of rows of compressor blades positioned upstream of the most upstream row of compressor blades of the first compressor.

11. Gas turbine engine according to claim 10, wherein the means for controlling the rotational speed of the first turbine comprises a variable gas flow guiding means arranged upstream of at least one row of compressor blades of the first compressor, wherein the variable gas flow guiding means is adapted to guide the gas flow such as to influence the rotational speed of the first compressor, and wherein the variable gas flow guiding means is positioned upstream of the first compressor and downstream of plurality of rows of compressor blades positioned upstream of the most upstream row of compressor blades of the first compressor.

12. Gas turbine engine according to claim 1, wherein a first rotor arrangement is attached to a first carrying frame positioned downstream of the first compressor and upstream of the combustion chamber, wherein the first rotor arrangement comprises the first compressor, the first shaft and the first turbine.

13. Gas turbine engine according to claim 12, wherein the first rotor arrangement also is attached to a second carrying frame that is positioned upstream of the first compressor.

14. Gas turbine engine according to claims 11, wherein a first rotor arrangement is attached to a first carrying frame positioned downstream of the first compressor and upstream of the combustion chamber, wherein the first rotor arrangement comprises the first compressor, the first shaft and the first turbine, the first rotor arrangement also is attached to a second carrying frame that is positioned upstream of the first compressor, and the variable gas flow guiding means is attached to the second carrying frame.

15. Gas turbine engine according to claim 8, wherein the radius of a gas turbine engine core is less along a distance where the first compressor and the second compressor overlap than upstream of the first compressor.

16. Gas turbine engine according to claim 13, wherein the radius of the gas turbine engine core is reduced, as seen in a downstream direction, at or around the second carrying frame.

17. Gas turbine engine according to claim 1, wherein the turbine blades of the first turbine has an outlet blade angle (β) of at least 60°.

18. Gas turbine engine according to claim 1, wherein the turbine blades of the first turbine has a camber of around 45° or lower.

19. Gas turbine engine according to claim 5, wherein the turbine blades of the first turbine has a lower amount of camber and a smaller thickness than the turbine blades of the second turbine.

20. Gas turbine engine according to claim 1, wherein the means for controlling the rotational speed of the first turbine comprises an arrangement for taking out mechanical power from the first shaft.

21. Gas turbine engine according to claim 20, wherein the arrangement for taking out mechanical power comprises an electric generator connected to the first shaft.

22. Gas turbine engine according to claim 1, wherein a casing defines an engine core of the gas turbine engine in which engine core the first turbine is positioned.

23. Gas turbine engine according to claim 1, wherein the gas turbine engine is a turbo-fan engine arranged for propulsion of an aircraft.

24. Method for controlling a gas flow rate in an axial flow gas turbine engine, wherein the method comprises:
causing gas flow from a combustion chamber to a turbine downstream of the combustion chamber, the turbine having no inlet stator associated therewith; and
controlling a rotational speed of a turbine, wherein the turbine is adapted to influence the normalized gas flow rate through the gas turbine engine depending on the rotational speed of the turbine.

25. Method according to claim 24, wherein it comprises:
adjusting a variable gas flow guiding means arranged upstream of at least one row of compressor blades of a compressor that is rotationally rigidly connected to the turbine.

26. Method according to claim 25, wherein it comprises:
decreasing the rotational speed of the turbine by adjusting the variable gas flow guiding means such as to increase a counter-swirl, or decrease a co-swirl, of the gas flow.

27. Method according to claim 24, wherein it comprises:
taking out mechanical power from a shaft that is rotationally rigidly connected to the turbine.

28. Axial flow gas turbine engine comprising
a first rotor arrangement comprising a first compressor,
a second rotor arrangement comprising a second compressor, wherein the first and second rotor arrangements are positioned concentrically and are arranged to rotate in opposite directions, and wherein the first compressor comprises a case arranged to rotate around the second compressor, which case is provided with a plurality of rows of compressor blades protruding in an inward direction towards the second compressor, wherein the first compressor and the second compressor overlap, wherein the second compressor extends in an axial direction of the gas turbine engine over a longer distance than the first compressor such that the first and second compressors overlap only partly,
a combustion chamber downstream of the first and second compressor; and
a first turbine having a turbine rotor arranged directly downstream of the combustion chamber so that no stator vanes or similar gas deflecting components are arranged in a region downstream of the combustion chamber and upstream of the first turbine rotor, and wherein there is no inlet stator associated with the first turbine.

29. Gas turbine engine according to claim 28, wherein the second compressor has a plurality of rows of compressor blades positioned upstream of the most upstream row of compressor blades of the first compressor.

30. Gas turbine engine according to claim 28, wherein the first rotor arrangement is attached to a first carrying frame positioned downstream of the first compressor.

31. Gas turbine engine according to claim 30, wherein the first rotor arrangement also is attached to a second carrying frame that is positioned upstream of the first compressor and downstream of a plurality of rows of compressor blades of the second compressor.

32. Gas turbine engine according to claim 28, wherein the radius of an engine core, in which rotor arrangements are positioned, is less along a distance where the first compressor and the second compressor overlap than upstream of the first compressor.

33. Gas turbine engine according to claim 31, wherein the radius of the engine core is reduced, as seen in a downstream direction, at or around the second carrying frame.

* * * * *